(12) United States Patent
Lester

(10) Patent No.: US 7,265,654 B1
(45) Date of Patent: *Sep. 4, 2007

(54) POWERLINE PULSE POSITION MODULATED TRANSMITTER APPARATUS AND METHOD

(75) Inventor: Marshall E. Lester, Los Angeles, CA (US)

(73) Assignee: Powerline Control Systems, Inc., Northridge, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/112,568

(22) Filed: Apr. 22, 2005

Related U.S. Application Data

(60) Provisional application No. 60/564,499, filed on Apr. 22, 2004.

(51) Int. Cl.
*G05B 3/00* (2006.01)
(52) U.S. Cl. .......................... 340/310.12; 340/310.11; 340/310.14
(58) Field of Classification Search ...................... None
See application file for complete search history.

(56) References Cited

U.S. PATENT DOCUMENTS

| | | | | |
|---|---|---|---|---|
| 3,689,888 A | * | 9/1972 | Wootton | 340/539.16 |
| 4,328,482 A | * | 5/1982 | Belcher et al. | 340/310.02 |
| 4,963,853 A | * | 10/1990 | Mak | 340/310.04 |
| 4,996,513 A | * | 2/1991 | Mak et al. | 340/310.04 |
| 5,614,811 A | * | 3/1997 | Sagalovich et al. | 323/207 |
| 5,933,072 A | * | 8/1999 | Kelley | 340/310.01 |
| 6,496,104 B2 | * | 12/2002 | Kline | 340/310.01 |
| 6,784,790 B1 | * | 8/2004 | Lester | 340/310.02 |

* cited by examiner

*Primary Examiner*—Daniel Wu
*Assistant Examiner*—Son Tang
(74) *Attorney, Agent, or Firm*—Lewis, Brisbois, Bisgaard & Smith LLP

(57) ABSTRACT

A transmitting controller is connected to a powerline and on command places a reference signal and a series of signal pulses in the powerline at a series of signal timing positions related to zero voltage crossing points so that the signals pulses are substantially in the powerline temporal quiet zone near zero crossing. The signal pulses are produced from a pair of capacitors and switches which are each sequentially charged a first polarity from the powerline and is discharged in the powerline at the opposite polarity so that the powerline voltage at the time of the pulse is additive to the pulse voltage. The receiving controller is connected to the powerline and has a filter circuit therein which filters away the powerline AC signal and noise to leave the reference and signal pulses. The signal pulses are compared to the position of starting reference pulses to determine in which signal timing position the pulses have occurred.

41 Claims, 7 Drawing Sheets

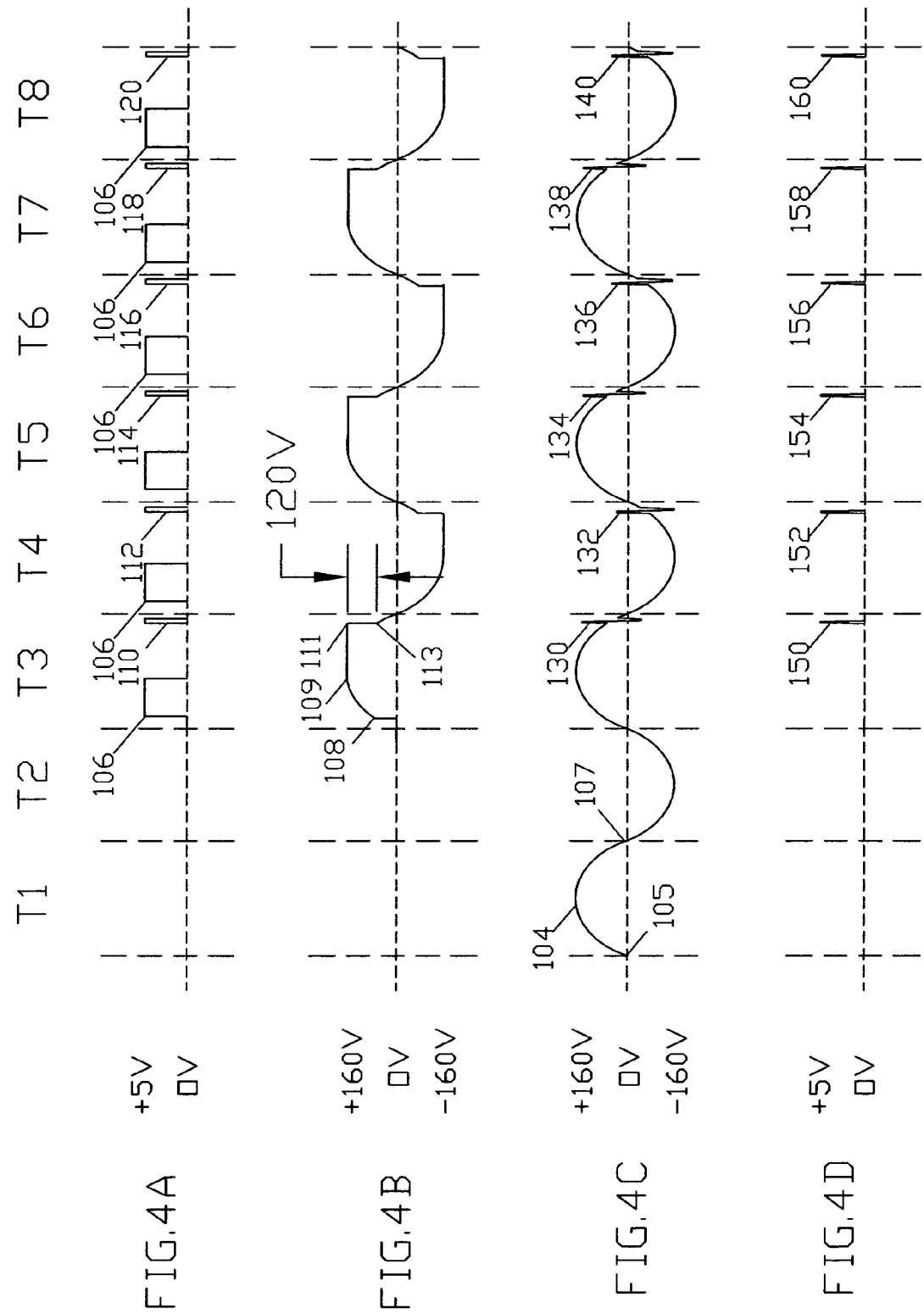

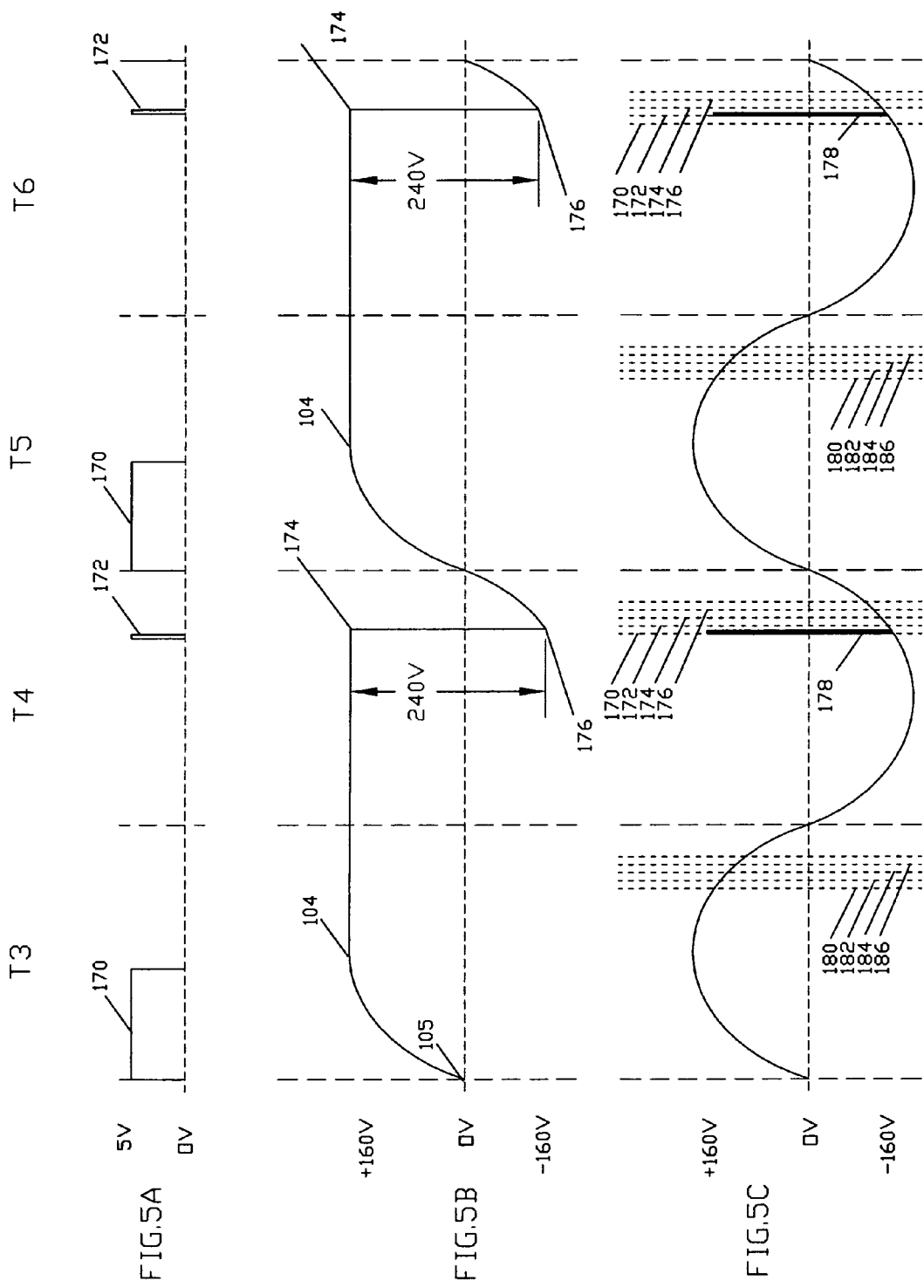

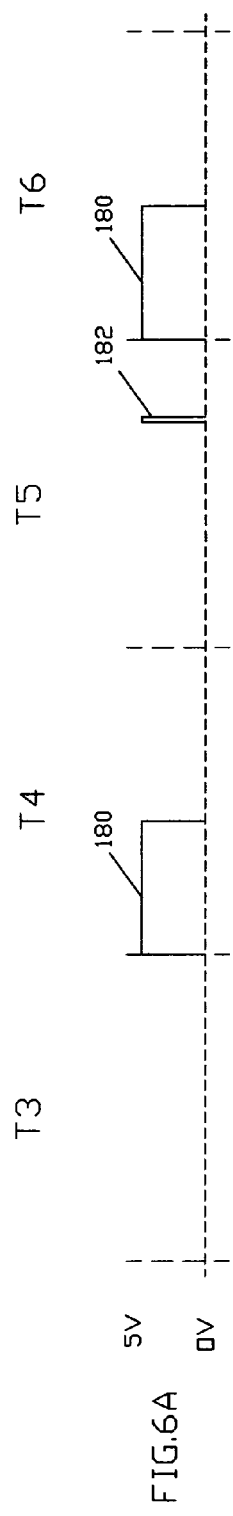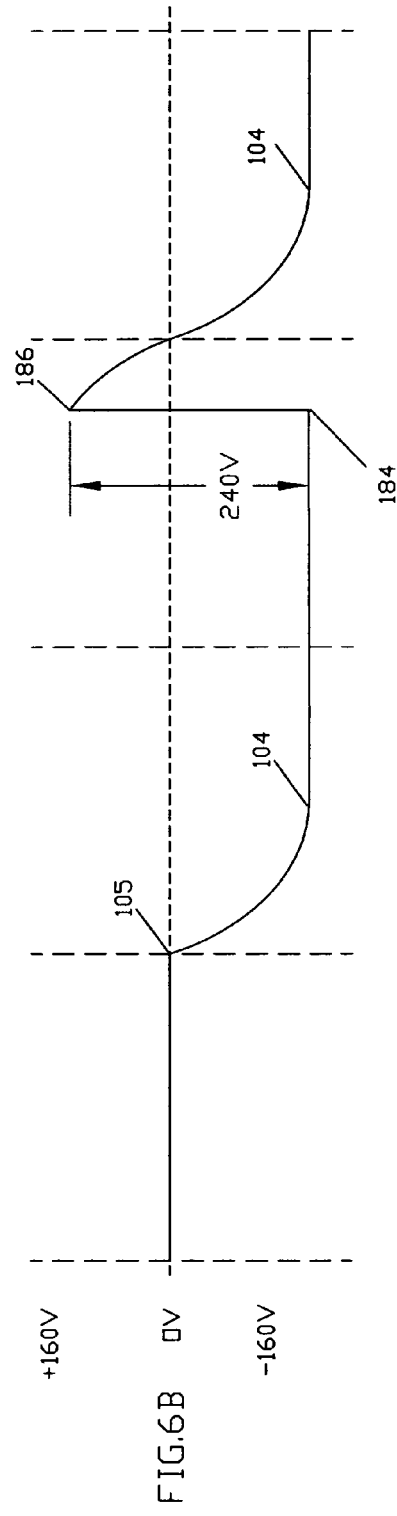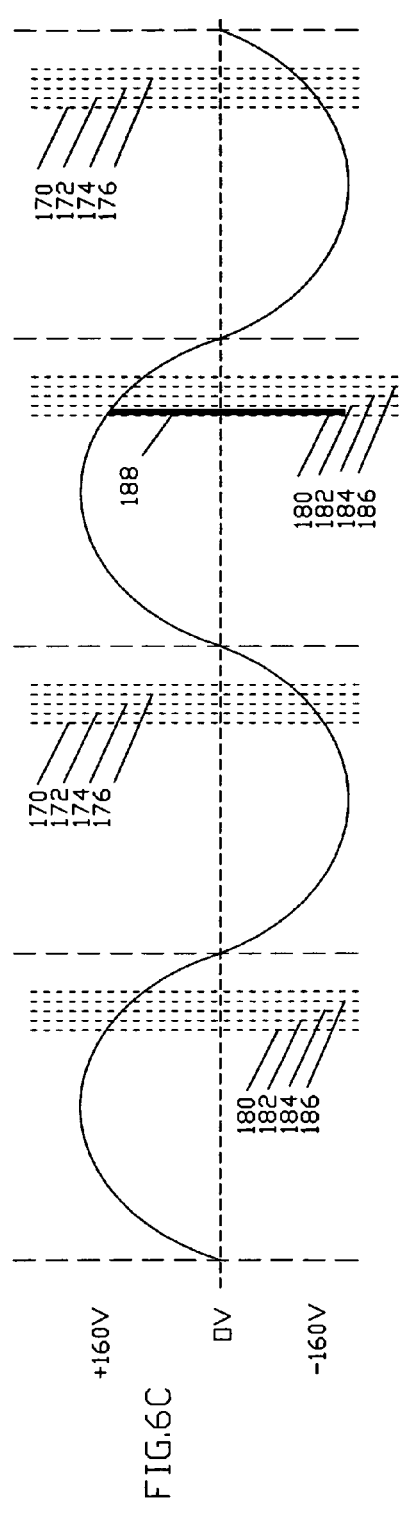

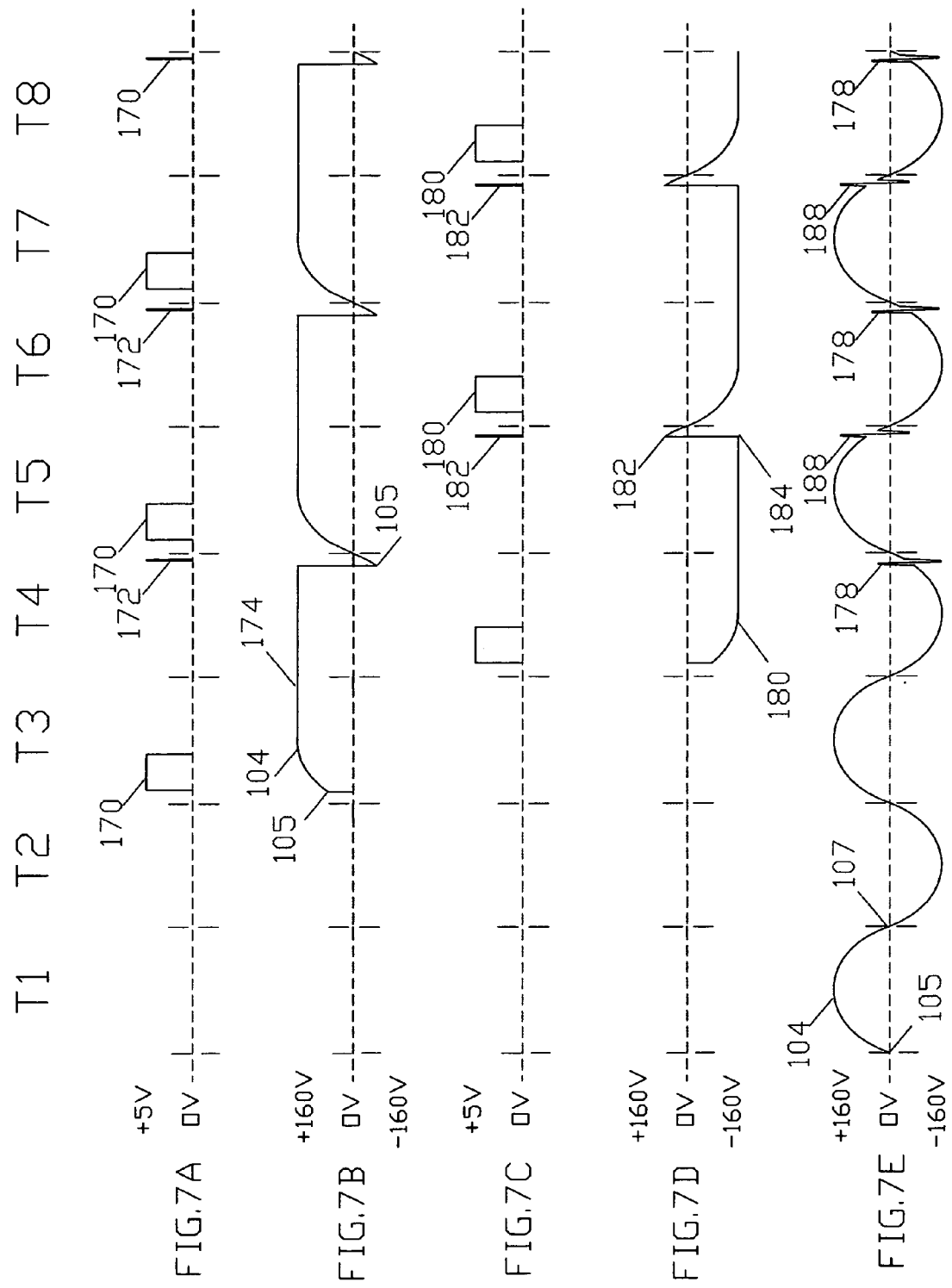

POWERLINE PULSE POSITION MODULATED TRANSMITTER APPARATUS AND METHOD

CROSS-REFERENCE

This invention is related to my prior applications, entitled "ZERO CROSSING BASED POWERLINE PULSE POSITION MODULATED COMMUNICATION SYSTEM", application Ser. No. 09/656,160, filed Sep. 6, 2000, now U.S. Pat. No. 6,734,784, granted May 11, 2004; and "SYNCHRONIZATION REFERENCE PULSE BASED POWERLINE PULSE POSITION MODULATED COMMUNICATION SYSTEM," filed Jun. 6, 2001, application Ser. No. 09/879,874, now U.S. Pat. No. 6,784.790, granted Aug. 31, 2004. This application relies for priority upon my prior Provisional Application 60/564,499 entitled "POWERLINE PULSE POSITION MODULATED TRANSMITTER APPARATUS AND METHOD," filed Apr. 22, 2004.

FIELD OF THE INVENTION

This invention is directed to an apparatus which enables the transmission of digital communication between two or more devices wherein the devices are connected to the same powerline and use the same powerline to receive power and as a physical channel for electronic intercommunication.

BACKGROUND OF THE INVENTION

There are devices which are more conveniently used if they can be remotely controlled. In a household, such devices are mostly appliances and lighting loads. The appliances and lighting loads may be remotely controlled for a number of different reasons. For example, for night security, some lights may be controlled by a timer.

In other cases, different lighting intensity and different lighting distribution may be desirable in a single room, depending upon its use. The room may be used for reading, conversation or watching displays, such as television. Each suggest a different lighting level and different lighting distribution. Normally, people do not make such changes because it is inconvenient to do so. Therefore, it is desirable to have a convenient, reliable way to remotely control lighting systems.

In addition to lighting systems, other devices can be conveniently remotely controlled. For example, powered gates and garage doors can be remotely controlled. An electric coffee pot may be turned on at an appropriate morning hour. Powered draperies may be opened and closed, depending upon sun altitude.

As electronic technology has advanced, inventors have produced a variety of control systems capable of controlling lighting and other electric loads. In order to be useful as a whole-house lighting control system, there are certain requirements that must be met. A system must permit both small and large groups of lights to be controlled on command. The problem is the connection between the controller and the lighting load. Such connection may be hard-wired, but such is complex and very expensive to retrofit into an existing home. Another connection system may operate at radio frequency, but this has proven difficult to implement because the FCC requires low signal levels which are subject to interference and because the transmission and receiving circuitry is complex and expensive.

It must be noted that both the controller and the load to be controlled are connected to the same powerline. It would be useful to use the powerline as the communication-connecting channel. Prior powerline communication schemes have had difficulties employing the powerline as a communication channel because the communication signals after being attenuated by the powerline circuitry are very small compared to the background noise. It is impossible to avoid the fact that between certain locations in a residence there will be very high attenuation of any transmitted signals. It has been difficult to reliably separate the highly attenuated communication signals from the background noise on the powerline.

The situation is further aggravated and complicated by the fact that the noise and attenuation parameters are constantly and unpredictably changing as loads are connected and disconnected both inside the primary residence and inside any of the many neighboring residences attached to the same mains power transformer. In reality the powerline circuit used for communication in a residence includes all the residences attached to the mains power transformer. There is no practical way to avoid the complications caused by this fact.

SUMMARY OF THE INVENTION

In order to aid in the understanding of this invention, it can be stated in essentially summary form that it is directed a specialized transmitter circuit and method to enable powerline pulse position modulated communication. The transmitting device senses the zero voltage crossing point in the powerline and transmits a series of signal pulses at a set of specified positions, the position of the data pulse relative to either the zero crossing time or the position of the starting reference pulses representing digital data in the form of a digital number. The set of all possible relative positions is in the quiet zone adjacent, but spaced from the main voltage zero crossing point. The energy needed to produce the signal pulses are stored in the capacitor. When the pulses are released to become a data pulse, they are released in the opposite half cycle from which they are charged. Thus, the amplitude of the pulse with respect to the zero crossing is the voltage of the power wave at the time of the pulse with respect to zero crossing, plus the voltage of the pulse with respect to zero crossing. The receiving circuit also senses the voltage zero crossing point and can reliably detect the signal pulse in the background powerline noise because of the knowledge of where the signal pulse is expected in the quiet zone adjacent, but away from the zero crossing point and because of the high magnitude of the very robust signal pulse even after significant residential attenuation. Since the data pulse is a voltage spike equal to the line voltage at the pulse point plus the discharge of the capacitor, the pulse can be more readily detected. After determining in which one of the possible relative positions the signal pulse was located, the associated digital data in the form of a digital number is easily determined. Thus digital data is communicated from one device through the powerline to another device using this method of powerline pulse position modulation. This patent describes a specific configuration of transmitting circuit and operation of that circuit to derive transmission signals that are much more effective that the previously described transmitter circuits. This transmitter circuit uses transmission components that are triggered in such a manner as to produce communication pulses in the next half cycle after the charging half cycle so that at the time the transmission pulse is produced the pulse voltage is additive to the line voltage with respect to zero which produces the most robust pulse possible that is derived directly from line voltage.

It is a purpose and advantage of this invention to provide a method and apparatus for reliable transmission of digital data over the powerline by means of a powerline pulse position modulation communication method utilizing a novel dual capacitor, dual switch circuit to provide much more robust data pulses when compared to our previous powerline pulse position modulation communication method that have only one available capacitor and switch to produce the necessary series of pulses.

It is a further purpose and advantage of this invention to provide a method and apparatus for powerline pulse transmission wherein the voltage zero crossing is sensed and the communication signal pulse is transmitted and sensed in a receiver based on the signal position relative to either the zero crossing point or the position of one or more of the previous transmitted pulses.

It is a further purpose and advantage of this invention to provide a method and apparatus by a powerline pulse position modulation transmission method for the purpose of remote electrical load control.

It is a further purpose and advantage of this invention to provide a method and apparatus wherein the voltage zero crossing is sensed, and digital pulse windows are defined with respect to the zero voltage crossing, but spaced from the zero voltage crossing so as not to interfere with other equipment using the zero voltage crossing time for various purposes.

It is a further purpose and advantage of this invention to provide a method and apparatus by a powerline pulse position modulation communication method for the purpose of remotely retrieving operational data from residential appliances.

It is a further purpose and advantage of this invention to provide a method and apparatus by a powerline pulse position modulation communication method for the purpose of remotely controlling residential loads for utility company energy management.

It is another purpose and advantage of this invention to provide a powerline pulse position modulated communication apparatus and method which complies with FCC regulations relating to apparatus which is connected to and communicating on the powerline.

The features of this invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIGS. 4A, 4B, 4C and 4D show the powerline waveforms containing the communication signals therein as utilized by the previous methods and in my previous applications.

FIGS. 5A, 5B, and 5C are powerline waveform diagrams showing the transmission positions employed by the apparatus of this invention for the half of the transmission circuit charging on the positive half cycles and discharging on the negative half cycles.

FIGS. 6A, 6B, and 6C are powerline waveform diagrams showing the transmission positions employed by the apparatus of this invention for the half of the transmission circuit charging on the negative half cycles and discharging on the positive half cycles.

FIGS. 7A, 7B, 7C, 7D and 7E are powerline waveform diagrams showing the transmission positions employed by the apparatus of this invention for combination of both transmitter sections described in FIG. 5 and FIG. 6.

DESCRIPTION OF THE PREFERRED EMBODIMENT

Figure 1:
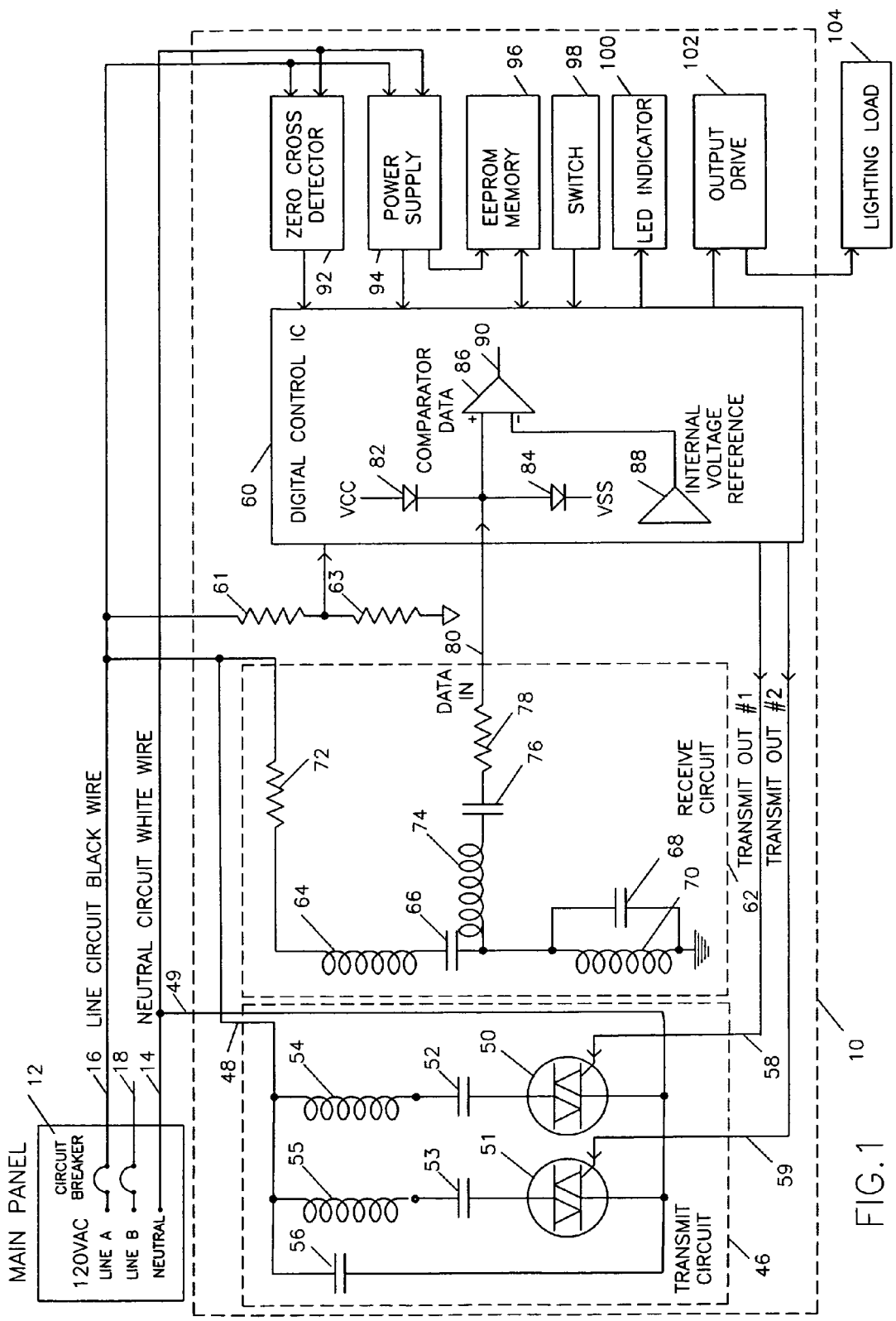
FIG. 1 is a schematic electrical diagram of the powerline pulse position modulated communication apparatus in accordance with this invention.

The purpose of the powerline pule position modulated communication transmitter apparatus of this invention as shown in FIG. 1 is to enable the communication of digital data from one device to another by means of the powerline to which both devices are connected. A further purpose is to enable communication with appliances and to control lighting or other electrical loads in one or more rooms of a residence.

Application Example Lighting Control System

Figure 2:
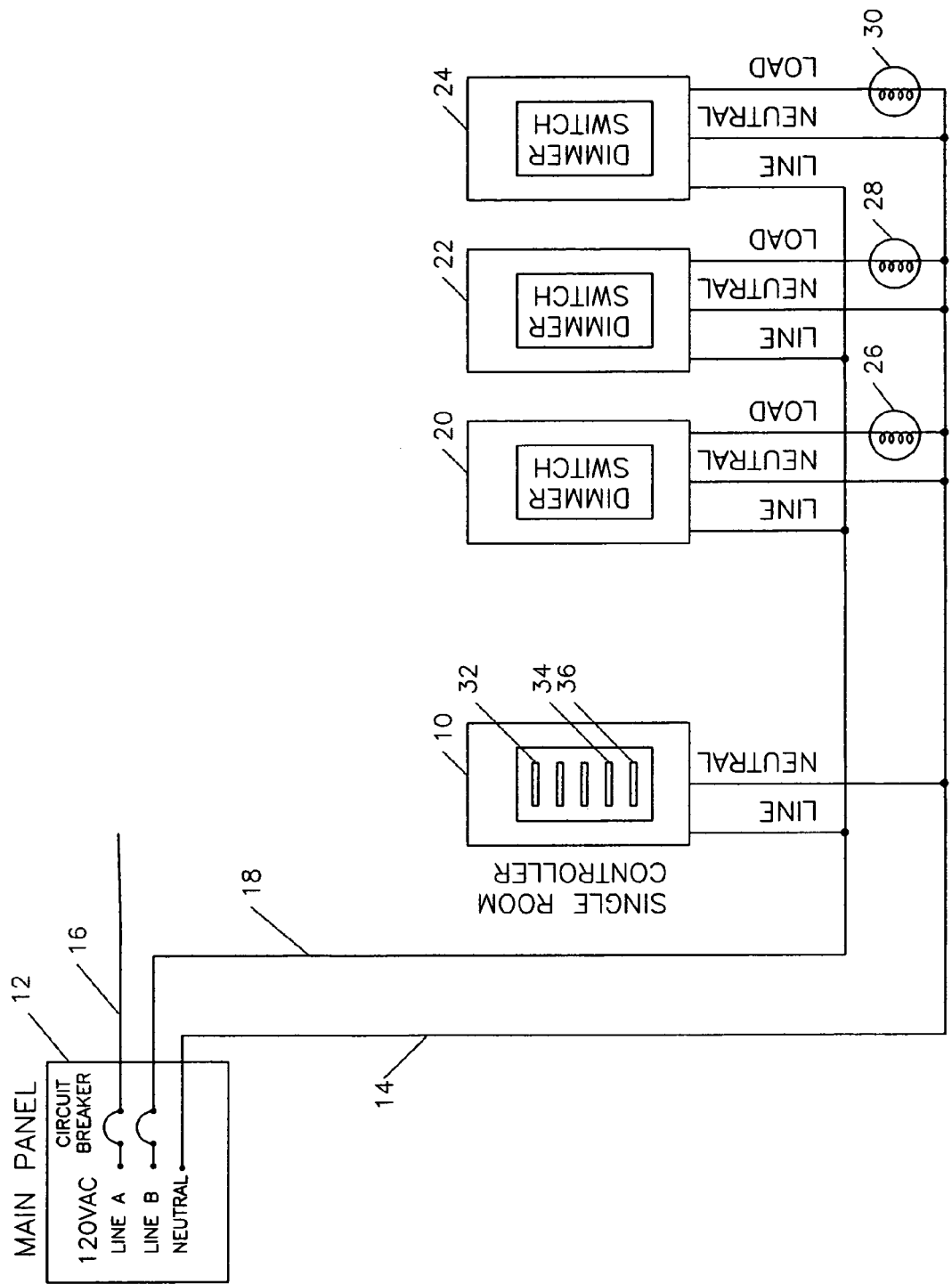
FIG. 2 is a schematic electrical diagram of how a plurality of such apparatus is used to control plural lighting loads in a room.
Figure 3:
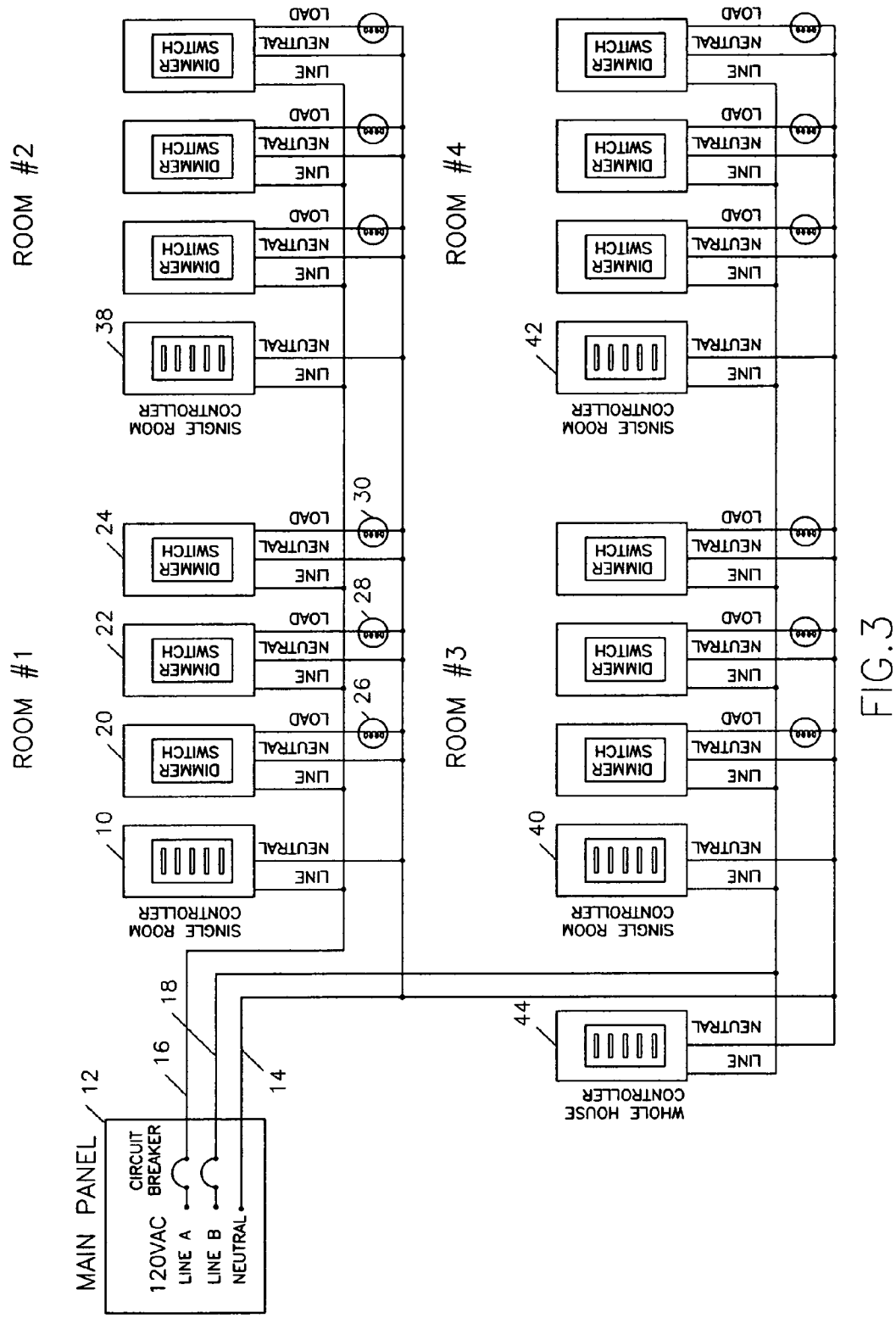
FIG. 3 is a schematic electrical diagram of how a plurality of such apparatus is used to control the lighting load in a plurality of rooms.

A lighting control system as shown in FIG. 2 and FIG. 3 will be used as an example of an application in this description of this invention.

In FIG. 2, transmitting controller 10 is supplied with conventional household electric power from circuit panel 12. Circuit panel 12 is supplied from commercial powerline and has two or three outputs. In the present example, the circuit panel 12 has a neutral line 14 and powerlines 16 and 18. Further, the powerlines 16 and 18 inside a domestic residence are derived from a center tapped 240 vac transformer and are each nominally at 120 rms volts with respect to neutral line 14. The voltage waves in powerlines 16 and 18 are at a 180 degree phase angle with respect to each other.

Also connected to the powerline 18 and neutral 14 are lighting load receiving controllers 20, 22 and 24. These receiving controllers are respectively connected to loads 26, 28 and 30. The loads are electric lights, in this example, but may be heater or motor loads as described above. Furthermore, the receiving controllers 20, 22 and 24 are capable of receiving digital commands which change the supply of power to the loads and may supply different levels of power to the loads to control the brightness of the lighting load. The transmitting controller 10 emits its digital commands into the powerline 18 for transmission to the receiving controllers 20, 22 and 24 by pressing one or more of the command buttons 160, 34 and 36 on transmitting controller 10. Thus, the receiving controllers 20, 22 and 24 receive digital commands from the transmitting controller 10 to control the loads 26, 28 and 30, respectively. No separate wiring or radio frequency communication is required, but the transmitting controller places signals in the powerline 18. Such transmitted signals are coded so that they can be detected by all of the receiving controllers.

A similar arrangement is seen in FIG. 3 wherein a main circuit panel 12 supplies power to four different rooms. The lighting and other loads in the four different rooms can be separately controlled in each room or can be controlled by a master, whole-house controller 44. Assuming room No. 1 in FIG. 3 is the same as the room in FIG. 2, it is seen that room 2, room 3 and room 4 are identical. Each room has a transmitting controller the same as controller 10 and three receiving controllers, the same as controllers 20, 22 and 24. Each of the receiving controllers controls a load, the same as loads 26, 28 and 30, respectively. Each of the transmitting controllers 38, 40 and 42 is identical to the transmitting controller 10, and each places digital command signals into the powerline. However, the receiving controllers are programmed to act only on the relevant command data. The response of the receivers is determined by the preprogrammed address and command-interpreting program located within each receiver. Thus, the loads in four or more rooms may each be controlled by a transmitting controller.

In addition, transmitting master controller 44 is connected to the powerline. It is identical to the transmitting controllers 10, 38, 40 and 42, but it is programmed differently to send out digital data signals which command receiving controllers to control their loads individually. The fact that transmitting controller 44 is connected only between powerline 18 and neutral 14 does not interfere with its ability and function to send signals to receiving controllers connected between powerline 16 and neutral 14.

Transmission and Receiving Circuit Operation

The transmitting controllers 10 and the receiving controllers 20 are identical, in the sense that they contain the same transmitting and receiving circuitry. They are programmed differently so as to achieve the desired different results. The controller 10 is schematically illustrated in FIG. 1. It has a transmitting circuit 46, which is connected to powerline 16 through line 48 and to neutral through line 49. The transmitting circuits comprises a pair of identical circuits, the first circuit consisting of triac 50 which is connected in series with energy storage capacitor 52. Inductor 54 is also in the series connection between line 48 and capacitor 52. Capacitor 56 forms a low pass filter with inductor 54 to minimize high frequency emissions so that the transmitter meets the FCC requirements. Triac 50 is controlled by line 58 which is the output from digital control integrated circuit 60. Hereinafter, the conventional abbreviation "IC" will be used in place of the term "integrated circuit." When the digital control IC sends an appropriate firing signal on line 58, the triac fires and puts a pulse in line 16 with respect to the neutral 14. The second identical circuit consists of a second triac 51, capacitor 53 and inductor 55. The filter capacitor 56 is common to both transmission circuits.

Controller 10 also contains a receiver circuit 62. The important components of the receiver circuit 62 form a band pass filter circuit. This includes capacitor 66, capacitor 68, capacitor 76, inductor 70, inductor 74 and inductor 64. Resistor 72 limits the current through the circuit. Resistor 78 is connected in series to limit the current in signal line 80. This circuit filters the signal pulse out of the powerline 60 cycle voltage and background noise.

Signal line 80 is connected into digital control IC 60 as its signal input. As a particular example, digital control IC 60 is a microprocessor Microchip model PIC16F87. The input signal line 80 is connected between two clipping diodes 82 and 84 to protect the digital control IC 60 from excessively high and low voltages. The signal input line 80 is connected to comparator 86 where the signal voltage is compared to internal voltage reference 88. The voltage reference 88, which is adjustable by the digital control IC 60 allows the digital control IC 60 to automatically adjust the receiving signal level to be set above the noise level. This is a form of automatic gain control which is essential so that the digital control IC 60 can discriminate between noise and real signal pulses. The comparator output 90 carries the received digital signal to the internal processing circuitry of the digital control IC.

There are additional inputs to the digital control IC 60. Zero crossing detector 92 is connected to powerline 16 and neutral 14. It has an output to the digital control IC 60. Power supply 94 supplies power to the digital control IC and to the EEPROM memory 96. There may be a plurality of the input switches, one of which is indicated at 98, for causing the digital control IC 60 to perform some internal operation or to issue transmitted commands. The commands of switch 98 correspond to the command buttons 160, 34 and 36 seen in FIG. 2. It is desirable that there be some method of visual feedback to the user for a variety of programming and control uses. This is provided by indicator light 100, which may be energized by the digital control IC 60. When the controller 10 is acting as a receiver load controller, it has an output circuit which controls the load. This output device 102 is in the form of a relay, triac, or the like. It controls the flow of power from line 16 to the load 104.

Pulse Position Modulation of Digital Data

FIG. 7E shows a sine wave 104 which represents the powerline voltage in one of the lines 16 or 18 of FIG. 2, as compared to neutral. Eight half cycles are shown. For the purpose of this disclosure, the powerline frequency is 60 cycles per second, which is the modern domestic standard. The voltage shown is nominally 120 volts rms, with peaks at about 160 volts, plus and minus. These are examples, and the apparatus and method can be utilized with other voltages and frequencies. Taking 60 cycles per second as the preferred embodiment, each half cycle, which is each of the intervals T, in all figures, is 8.333 milliseconds.

Transmitter Operation

In FIG. 7E, the voltage through the time periods T1, T2, and T3 is a plain sine wave 104 with no communication pulses. During the next five half cycles, T3 through T8, there is a superimposed pulse on the sine wave near to each of the positive and negative zero crossing points. One positive and one negative zero crossing point are indicated at 105 and 107 respectively. In FIGS. 7A, 7B, 7C and 7D, the zero crossing point is represented as the transition from one time period to the next. These superimposed pulses are the means of communication. The transmitting device places these pulses on the powerline. Receiving devices detect these pulses on the powerline.

Each pulse can represent one transmitted data number. The number transmitted can range from 1 to N where N is the total number of possible positions of one pulse. In FIGS. 5C and 6C a sine wave is shown with the four positions highlighted in each half cycle. Positions number 0,1,2, and 3 are identified on FIG. 5, half wave T3 as 180, 182, 184, and 186, respectively and in FIGS. 5C and 6C, half wave T4 as 170, 172, 174, and 176, respectively. The current embodiment utilizes four positions located in the quiet zone spaced from, but just before zero crossing. If the total time allotted to the four positions is 400 uS then the spacing of each position relative to the next possible position will be 100 uS. This is shown in FIGS. 5C and 6C. By placing a pulse in one of the possible four positions, one numeric digit, from 0 to 3, can be transmitted every half cycle. In binary, this is equal to two bits per half cycle. Up to 256 positions are possible with current microprocessor technology. In binary, a number with 256 possible states is equal to eight bits or one byte per half cycle.

When a powerline transmission consisting of a series of pulses is desired, the first need is to charge the capacitor 52 in FIG. 1. Before the initial charging the initial charge state of the capacitor 52 is unknown. The digital control IC puts an initial trigger pulse 170, see FIG. 5A, in line 58 to begin turning on triac 50 to begin charging capacitor 52. The initiating pulse is preferably near a zero crossing but is not critical. This turns on the triac 50, and the capacitor 52 begins charging. FIG. 5B shows the voltage across capacitor 52, and the start of its charging is shown at point 105. The curve in FIG. 5B after the point 105 is the traditional capacitor charging curve. This does not yet produce a pulse in the powerline. Once the triac 50 is conductive, another initiating trigger pulse for charging is not necessary. Once the triac is charged and discharged, it will continue to charge in the opposite polarity and will be ready to discharge in the next half cycle, as seen in FIG. 5B. The triac turns off and the capacitor stops charging each time the charging current through the triac 50 reaches zero, which occurs at every peak of the mains sine wave, which is shown at 104 in FIG. 5B. When it is desired that a signal pulse be placed on the powerline, digital control IC 60 places a trigger pulse in line 58 to fire triac 50. These trigger pulses are shown at 172, FIG. 5A. This pulse produces conduction in triac 50 to create the corresponding signal pulse 178, in the powerline, as shown in FIG. 5C. The waveform in FIG. 5B is shown as a reference of the voltage across transmitting capacitor 52 as it is charged and discharged. As it is discharged every other half cycle, which is shown in FIG. 5C in the negative half cycles, a pulse is produced in the powerline.

The fact that the capacitor charge voltage is so much greater if the capacitor is discharged in the following half cycle as opposed to the same half cycle in which the charging began is the fundamental reason the pulse strength in this method is so strong. In the half cycle following charging, the powerline voltage is opposite that of the capacitor voltage and thus the two are additive to produce a strong pulse signal.

In order to be compatible with the transmission circuits and methods of prior it is necessary to produce messages consisting of one pulse per half cycle. With the present method discussed above and shown in FIGS. 5, 6 and 7 using only one capacitor in series with one switch, only one pulse can be produced on every other half cycle. Therefore two independent capacitor/switch circuits are required to combine their resulting pulse trains occurring on every other half cycle into one composite pulse train with one pulse on every half cycle. This composite pulse train with the two pulse trains of FIG. 5 and FIG. 6 combined is shown in FIG. 7.

The simple reason this method of producing transmission pulses is superior to the method using a single capacitor is shown clearly in FIGS. 4B and 5B. In FIG. 4B the voltage across the capacitor at the time of discharge is approximately 120V. In FIG. 5B the voltage across the capacitor at the time of discharge is approximately 240V. The larger voltage difference in FIG. 5B at the time of discharge produces a much stronger pulse. The larger pulse in turn produces more reliable transmission and communication. It has been found that this stronger method of transmitting works in certain high attenuation applications where the single capacitor method is unreliable. The seemingly obvious method of increasing signal strength by increasing the size of the transmitting capacitor does not work. Increasing the size after a certain size produces no change in the signal strength. The novel method utilized by this invention produces a very large increase in signal strength.

The reason two separate capacitor, switch transmission circuits are needed is because that the time between charging and discharging of one capacitor is more than one half cycle therefore each capacitor can only produce one pulse on every other half cycle.

Since only one pulse can be transmitted per half cycle with this circuit design, one and only one number can be transmitted each half cycle. The reason this method of modulating data is named "pulse position modulation" herein is because the value of the data is encoded in the position of the pulse.

Because of attenuation, background noise, and other periodic and intermittent random noise pulses present on the powerline, these signal pulses would ordinarily be difficult to detect. However, in accordance with this invention, when the pulse is stronger or of greater magnitude it is easier to detect.

To summarize, there are four primary reasons the area from 1000 uS to 500 uS before zero crossing is selected for our transmission period. First, because a relatively large pulse is generated because the capacitor is charged to a large voltage. Second, because there is a relatively is charged to a large uniform voltage from the beginning of this period to the end of this period. Third, because there is little interference caused by the communication pulses to devices that utilize the powerline zero crossing for various purposes, such as clocks or light dimmers. Fourth, because there is very little noise from pulse producing devices, such as light dimmers, during this period. The novel design presented here is for a simple method of greatly increasing signal strength of each transmitted pulse to increase overall communication reliability.

The manner of operation of this receiving circuit 62 in FIG. 1 has been discussed above. It is connected to the line and awaits the incoming pulse. The powerline frequency and noise are filtered out, but the signal pulse can readily be detected because it is within the 1000 microsecond quiet zone near the zero crossing point. When the pulse is sensed, the signal position in which it is located is determined by the Digital Control IC 60.

In a message transmission on each half cycle one pulse is received. A pulse may be a reference pulse at the start of the message or a data pulse following one or more reference pulses. Each pulse will be in one of several possible temporal positions that may be referenced to zero crossing or a previous reference or data pulse. Each of the possible temporal positions will represent a different data number. If there are four positions, as in the current embodiment, then one of the numbers, 0,1,2 or 3 can be transmitted by one pulse in one half cycle. A string of these pulses and derived numbers are combined to make a complete message.

This is the fundamental method of transmitting and receiving numerical data. This series of numerical data is stored in the Digital control IC and processed according to the application program requirements. If the device is a lighting controller, the data would most likely represent lighting system addresses and command instructions. Other applications would have other meanings for the decoded data. Some application devices such as a powerline modem might use the invention for pure communication of data and may not have a specific application function.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A powerline pulse position modulated communication transmitter comprising:

first and second connections for connecting to an AC powerline;

a first chargeable capacitor and a first switch in series with said first capacitor coupled to said first and second connections for connection in parallel to the AC powerline;

a second chargeable capacitor and a second switch in series with said second capacitor coupled to said first and second connections for connection in parallel to the AC powerline;

a digital control integrated circuit;

a zero voltage crossing detector circuit coupled to at least one of said first and second AC powerline connections and to said digital control integrated circuit;

said digital control integrated circuit being coupled to said first switch in series with said first capacitor to actuate said first switch to charge said first capacitor in a first half cycle and to also discharge said capacitor in a second half cycle following said first half cycle, said first and second half cycles being of opposite polarity, said discharge occurring in one of a predetermined number of a plurality of signal time positions;

said digital control integrated circuit being coupled to said second switch in series with said second capacitor to actuate said second switch to charge said second capacitor in a first half cycle and to also discharge said capacitor in a second half cycle following said first half cycle, said first and second half cycles being of opposite polarity, said discharge occurring in one of a predetermined number of a plurality of signal time positions;

said digital control integrated circuit controlling said first switch and controlling said second switch to discharge said first capacitor and discharge said second capacitor to occur on alternating half cycles of opposite polarity.

2. The powerline pulse position modulated communication transmitter of claim 1 wherein there is a memory, said memory being organized to cause said digital control integrated circuit to provide an appropriate series of said signal pulses representing digitally encoded data in response to said signal source to actuate said digital control integrated circuit.

3. The powerline pulse position modulated communication transmitter of claim 1 wherein said switch in series with said capacitor is a triac and said triac is connected to be actuated by said transmitting digital control integrated circuit so that said triac permits charging of said capacitor in either polarity of the powerline.

4. The powerline pulse position modulated communication transmitter of claim 3 wherein said digital control integrated circuit is programmed to actuate said triac to permit charging of said capacitor before signal pulses are desired, in order to have a charge on said capacitor when an actuating pulse actuates said triac to cause a signal pulse in the powerline in a selected signal position.

5. The powerline pulse position modulated communication transmitter of claim 3 wherein said transmitter is one of two controller parts of a controller system, both said controller parts being connectable to the same powerline for communication therebetween on the powerline, said system comprising two controllers, one acting as said transmitting controller and the other acting as a receiving controller, each said transmitting controller and said receiving controller respectively containing a transmitting digital control integrated circuit and a receiving digital control integrated circuit and each having a zero voltage crossing detector circuit connected thereto, and each said controller having both a transmitting circuit and a receiving circuit so that either said controller can act as a transmitting controller or as a receiving controller, utilizing a copy of the same digital control integrated circuit.

6. The powerline pulse position modulated communication transmitter of claim 5 wherein each said controller has a transmitting circuit comprised of a pair of triacs each serially connected to a capacitor, said serially connected triacs and capacitors being coupled to the powerline, said triac being coupled to be controlled by said digital control integrated circuit; and each said controller has a receive circuit comprising a filter circuit for connection to the powerline, said filter having an output signal line connected to said digital control integrated circuit so that said digital control integrated circuit can detect the timing of a signal pulses with respect to the zero voltage crossing.

7. The powerline pulse position modulated communication transmitter of claim 6 wherein a memory is connected to an integral part of said digital control integrated circuit, said memory being programmed to define signal timing positions prior to and spaced from zero crossing so that said transmitting digital control integrated circuit can transmit a one or more reference pulses to the powerline at a selected signal timing position when acting as a transmitter, and said receiving digital control integrated circuit can determine at which signal timing position a reference signal pulse occurs when said apparatus is acting as a receiving controller.

8. The powerline pulse position modulated communication transmitter of claim 6 wherein a memory is connected to or an integral part of said digital control integrated circuit, said memory being programmed to define signal timing positions prior to and spaced from zero crossing so that said transmitting digital control integrated circuit can transmit a one or more data pulses to the powerline at a selected signal timing position related to the position of said reference pulses when acting as a transmitter, and said receiving digital control integrated circuit can determine at which signal timing position a data signal pulse occurs relative to said reference pulse when said apparatus is acting as a receiving controller.

9. The powerline pulse position modulated communication transmitter of claim 1 wherein said digital control integrated circuit senses voltage zero crossing in the powerline and emits actuating pulses to said switch to cause one or more reference pulses at timing positions within a predetermined time range within the quiet zone prior to the zero crossing time.

10. The powerline pulse position modulated communication transmitter of claim 1 wherein said digital control integrated circuit emits actuating pulses to said switch to cause one or more data pulses at timing positions within a predetermined time range prior to the zero crossing time.

11. The powerline pulse position modulated communication transmitter of claim 1 wherein there are at least two predetermined signal timing positions prior to zero crossing.

12. The powerline pulse position modulated communication transmitter of claim 1 wherein there is an output driver connected to said digital control integrated circuit, said output driver being connectable to a load so that said output driver can be actuated to energize the load.

13. A powerline pulse position modulated communication system comprising:
a transmitter, first and second connections for connecting said transmitter to an AC powerline, said transmitter having a zero voltage crossing detector coupled to said connections, said transmitter having a circuit for producing a series of pulses, said transmitter comprising:
first and second pulse producing circuits each comprising a capacitor and a switch coupled to said first and second connections, said transmitter actuating said pulse producing circuits in a powerline half cycle opposite to and following the half cycle in which the capacitor finished charging so that the capacitor voltage and line voltage are added;
a signal source connected to said circuit to actuate said transmitter circuit so as to produce one or more reference pulses in the powerline of reference pulse positions which are each in one of a plurality of predetermined signal time positions, said signal source being actuated to produce a plurality of subsequent pulses in one of said plurality of signal time positions following said reference pulse; and
a receiver having first and second connections for connecting to the same AC powerline, a zero voltage crossing detector in said receiver connected to said first and second connections and a circuit responsive to a reference pulse so that subsequent pulses following the reference pulse in one of the signal timing positions can be detected as a function of the time after the reference pulse.

14. The powerline pulse position modulated communication system of claim 13 wherein said receiver has a digital control integrated circuit which senses signal pulses only at predetermined timing positions within a predetermined time range close to the zero crossing time.

15. The powerline pulse position modulated communication system of claim 14 wherein there are at least two signal timing positions near zero crossing.

16. The powerline pulse position modulated communication system of claim 13 wherein both said transmitter and said receiver are structurally similar apparatus and are connectable to the same powerline, said system comprising two of said apparatus, one acting as a transmitting controller and the other acting as a receiving controller, each said transmitter and each said receiver respectively containing a digital control integrated circuit which can be programmed to act as a transmitting digital control integrated circuit or a receiving digital control integrated circuit, each said apparatus having a zero voltage crossing detector circuit connected therein, and each said apparatus having both a transmitting circuit and a receiving circuit so that either said apparatus can act as a transmitting controller or as a receiving controller, utilizing the same digital control integrated circuit.

17. The powerline pulse position modulated communication transmitter of claim 13 wherein said received signal pulses are received by a circuit incorporating a means for automatically adjusting the receive detection voltage level to provide automatic gain control.

18. A powerline pulse communication apparatus comprising:
a transmitting controller and a receiving controller, said transmitting controller and said receiving controller each having connections to an alternating current powerline;
said transmitting controller having a zero voltage crossing detector circuit with connections for connecting to the alternating current powerline, said transmitting controller having a digital control integrated circuit therein, said zero voltage crossing detector circuit having an output connected to said digital control integrated circuit;
a command input means connected to said digital control integrated circuit so that when said command input means is actuated said digital control integrated circuit emits a trigger signal;
a serially connected switch and capacitor having connections for coupling to the alternating current power supply so that, when said switch is actuated, said capacitor is charged by the alternating current power supply to a peak voltage of a half cycle of a first polarity, said switch being connected to receive a trigger signal from said digital control integrated circuit, said digital control integrated circuit being programmed so that the trigger signal is within a predetermined time period referenced to a prior zero crossing and said capacitor is discharged in a powerline half cycle of second polarity which is opposite to that of the said first polarity so that the signal pulse is added to the powerline voltage within said predetermined time period near to but spaced from a zero crossing.

19. The powerline pulse communication apparatus of claim 18 wherein said digital control integrated circuit is programmed to turn on said switch at a time to produce one or more powerline reference pulses each at one of a plurality of predetermined temporal positions referenced to the zero voltage crossing point.

20. The powerline pulse communication apparatus of claim 18 wherein said digital control integrated circuit is programmed to turn on said switch at a time to produce the powerline data pulse at one of a plurality of predetermined temporal positions referenced to the reference pulse position.

21. The powerline pulse communication apparatus of claim 18 wherein said digital control integrated circuit is programmed to turn on said switch at a time to produce the powerline data pulse at one of a plurality of predetermined temporal positions referenced to the zero crossing position.

22. The powerline pulse communication apparatus of claim 18 wherein there are at least four temporal positions separately defined by said digital control integrated circuit within the quiet zone within about 1,000 to 500 microseconds of zero voltage crossing.

23. The powerline pulse communication apparatus of claim 22 wherein each of said temporal positions is approximately 160 microseconds apart.

24. The powerline pulse communication apparatus of claim 23 wherein said receiving digital control integrated circuit is programmed to distinguish between different temporal positions within said predetermined time period near to but spaced from zero crossing.

25. The powerline pulse communication apparatus of claim 24 wherein said receiving digital control integrated circuit is programmed to distinguish between different temporal positions within said predetermined time period relative to the position of reference pulses.

26. The powerline pulse communication apparatus of claim 24 wherein said receiving digital control integrated circuit is programmed to distinguish between different temporal positions within said predetermined time period relative to the position of the zero crossing time.

27. The powerline pulse communication apparatus of claim 18 wherein there is a receiving controller and said receiving controller also has a zero voltage crossing detector circuit and a receiving digital control integrated circuit, said zero voltage crossing detector circuit being connected to said receiving digital control integrated circuit;

a filter circuit having connections for connection to the powerlines to receive power signals and communication pulses superimposed therein by a transmitting controller, said filter circuit substantially filtering out all signals except any command pulse in the powerline, said filter circuit being connected to said receiving digital control integrated circuit, said receiving digital control integrated circuit being programmed to be sensitive only to signal pulses within a predetermined time period near to but spaced from zero crossing.

28. The powerline pulse communication apparatus of claim 27 wherein there is an output controller connected to said receiving digital control integrated circuit and said output controller is for connection to the alternating current powerline and to an electrical load, said output controller turning on said load when said receiving digital control integrated circuit detects pulses in said powerline corresponding to a command to energize the load.

29. The powerline pulse communication apparatus of claim 18 wherein said transmitting digital control integrated circuit is programmed to turn on said switch at a time to produce the powerline pulse within one of several temporal positions near to zero voltage crossing.

30. The powerline pulse communication apparatus of claim 29 wherein there are at least four possible temporal positions separately defined by said processor within said predetermined time period near to zero crossing.

31. The powerline pulse position modulated communication system of claim 30 wherein said predetermined quiet time period is between about 500 microseconds and 1000 microseconds away from zero voltage crossing.

32. The powerline pulse communication apparatus of claim 29 wherein each of said temporal positions is approximately 160 microseconds apart.

33. A powerline pulse position modulated system comprising:

a transmitter, first and second connections on said transmitter for connecting to an AC powerline, a zero voltage crossing detector connected to said connection, a circuit in said transmitter for creating a pulse charge when the powerline is in a first polarity and for discharging the pulse charge into the powerline when the powerline is in the opposite polarity to add a pulse into the powerline which is additive to the powerline voltage, said circuit receiving zero voltage crossing information from said zero voltage crossing detector circuit and creating a pulse in the powerline in a quiet zone window which is positioned in a predetermined quiet time period near to zero voltage crossing; and a receiver having first and second connections for connecting to the AC powerline, a zero voltage crossing detector in said receiver connected to said first and second connections and to a control IC in said receiver, said IC being conditioned by the zero voltage crossing detector to receive signal pulses from the powerline within the quiet zone which is positioned in a predetermined quiet time period near to zero voltage crossing.

34. A powerline pulse position modulated system communication method for remotely controlling a load, comprising the steps of:

providing a transmitting controller for connection to the powerline;

sensing zero voltage crossing in the powerline;

sensing a load control command and causing the discharging of a capacitor across the powerline in a half cycle of the powerline that is opposite in polarity and following a half cycle of the powerline in which said capacitor finished charging to cause transmission of one or more reference pulses related to the zero crossing sensing and the load control command;

causing the discharging of a capacitor across the powerline in a half cycle of the powerline that is opposite in polarity and following a half cycle of the powerline in which said capacitor finished charging to cause transmission of a series of actuating data pulses related to the position of the reference pulse and the load control command;

sensing at a receiving controller the zero voltage crossing, sensing the said one or more reference pulses, sensing the data pulses and determining in which signal timing positions the data pulses are located as compared in positions that the reference pulses occurred; and actuating the load depending upon in which signal timing positions the data pulses occurred.

35. The method of claim 34 wherein the charging and discharging of the capacitor to place a pulse in the powerline is caused by actuating a triac to become conductive.

36. The method of claim 35 wherein the timing of the trigger pulses to the triac to produce the charging and discharging of the capacitor to produce a series of signal positions adjacent zero crossing times which correspond to a command for load control are related to the powerline zero crossing times.

37. The method of claim 35 wherein the timing of the trigger pulses to the triac are related to the reference pulse times by discharging the capacitor at a series of signal positions adjacent zero crossing times which correspond to a command for load control.

38. The method of claim 37 wherein the signal timing positions are approximately 160 microseconds apart.

39. The method of claim 37 wherein the sensing at which signal timing position the series of pulses occurred is correlated with a load command to appropriately actuate a load.

40. The method of claim 34 wherein the signal timing positions are between about 500 and 1000 microseconds away from the zero crossings of the powerline voltage.

41. The method of claim 34 wherein the receiving controller filters the signal out of the powerline voltage adjacent the zero crossing where the powerline is substantially quiet and delivers a series of sensed signal pulses to the digital control integrated circuit which determines at which signal timing positions said series of pulses occurred.

\* \* \* \* \*